(12) United States Patent
Kurata et al.

(10) Patent No.: US 10,539,097 B2
(45) Date of Patent: Jan. 21, 2020

(54) SADDLE-RIDDEN TYPE VEHICLE

(71) Applicant: HONDA MOTOR CO., LTD., Tokyo (JP)

(72) Inventors: Ko Kurata, Wako (JP); Takeshi Shimura, Wako (JP); Teppei Maeda, Wako (JP); Hiroshi Inaoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 481 days.

(21) Appl. No.: 15/251,377

(22) Filed: Aug. 30, 2016

(65) Prior Publication Data

US 2017/0089303 A1 Mar. 30, 2017

(30) Foreign Application Priority Data

Sep. 29, 2015 (JP) ................. 2015-192206

(51) Int. Cl.
| | |
|---|---|
| *F02M 25/08* | (2006.01) |
| *B60K 15/035* | (2006.01) |
| *B60K 15/063* | (2006.01) |
| *B60K 15/07* | (2006.01) |
| *B60K 15/073* | (2006.01) |
| *B60K 15/03* | (2006.01) |

(52) U.S. Cl.
CPC ..... *F02M 25/089* (2013.01); *B60K 15/03504* (2013.01); *B60K 15/07* (2013.01); *B60K 15/073* (2013.01); *F02M 25/0872* (2013.01); *B60K 2015/0348* (2013.01); *B60K 2015/03473* (2013.01); *B60K 2015/0636* (2013.01)

(58) Field of Classification Search
CPC ............ F02M 25/0872; F02M 25/089; B60K 15/03504; B60K 15/06; B60K 15/07; B60K 15/073; B60K 2015/03514
See application file for complete search history.

(56) References Cited

U.S. PATENT DOCUMENTS

| | | | | |
|---|---|---|---|---|
| 3,884,204 A | * | 5/1975 | Krautwurst | B60K 15/03504 123/519 |
| 4,815,436 A | * | 3/1989 | Sasaki | B60K 15/03504 123/520 |
| 5,056,494 A | * | 10/1991 | Kayanuma | F02M 25/0872 123/516 |
| 5,441,031 A | * | 8/1995 | Kiyomiya | F02M 25/08 123/518 |

(Continued)

FOREIGN PATENT DOCUMENTS

JP 5101686 B 10/2012

*Primary Examiner* — Joseph M Rocca
*Assistant Examiner* — Maurice L Williams
(74) *Attorney, Agent, or Firm* — Birch, Stewart, Kolasch & Birch, LLP

(57) ABSTRACT

A saddle-ride type vehicle for enabling the placement of canisters with a required absorption-chamber capacity in a compact manner. The saddle-ride type vehicle includes a head pipe supporting a steering shaft connecting with a handlebar; a vehicle-body frame connecting with the head pipe; a fuel tank placed to the rear of the head pipe and supported on an upper portion of the vehicle-body frame; and a pair of canisters for absorbing evaporated fuel introduced from the fuel tank. The canisters are vertically placed under one side portion of the fuel tank in a position along the vehicle-longitudinal direction.

20 Claims, 6 Drawing Sheets

(56) References Cited

U.S. PATENT DOCUMENTS

| | | | |
|---|---|---|---|
| 2007/0215123 A1* | 9/2007 | Ito | F02M 25/0872 123/519 |
| 2008/0283127 A1* | 11/2008 | Wang | B60K 15/03519 137/313 |
| 2010/0001031 A1* | 1/2010 | Yamamuro | F02M 25/089 224/567 |
| 2010/0095938 A1* | 4/2010 | Kosugi | B60K 15/03504 123/519 |
| 2010/0224172 A1* | 9/2010 | Kusa | B60K 15/03504 123/520 |
| 2011/0120796 A1* | 5/2011 | Kuramochi | B62J 37/00 180/219 |
| 2011/0192668 A1* | 8/2011 | Kitta | B60K 15/03504 180/219 |
| 2012/0186563 A1* | 7/2012 | Hasegawa | B01D 53/0415 123/519 |
| 2013/0000610 A1* | 1/2013 | Yamamoto | F02M 25/0854 123/519 |
| 2013/0219871 A1* | 8/2013 | Crandell | F01N 3/2066 60/295 |
| 2014/0060955 A1* | 3/2014 | Kono | F02M 35/162 180/291 |
| 2014/0083298 A1* | 3/2014 | Walz | B60K 15/03504 96/136 |
| 2015/0210161 A1* | 7/2015 | Nolan | B60K 15/063 280/834 |
| 2016/0229476 A1* | 8/2016 | Yasuta | B62J 15/00 |
| 2016/0377032 A1* | 12/2016 | Kimoto | F02M 25/0872 123/519 |
| 2017/0009707 A1* | 1/2017 | Kuboyama | F02M 25/0854 |

* cited by examiner

SADDLE-RIDDEN TYPE VEHICLE

CROSS-REFERENCE TO RELATED APPLICATIONS

The present application claims priority under 35 USC 119 to Japanese Patent Application No. 2015-192206 filed Sep. 29, 2015 the entire contents of which are hereby incorporated by reference.

BACKGROUND OF THE INVENTION

1. Field of the Invention

The present invention relates to a saddle-ride type vehicle equipped with a canister.

2. Description of Background Art

Commonly, cars are mounted with a canister for absorbing evaporated fuel generated in a fuel tank in order to prevent evaporated fuel generated in a fuel tank from being released into the atmosphere. An absorption chamber capacity required for speedy absorption of evaporated fuel displaced from the fuel tank is ensured in the canister. However, finding room for installing a large-capacity canister is difficult.

To address problem, a plurality of canisters may be used to ensure the required absorption-chamber capacity. See, for example, JP Patent No. 5101686 wherein a canister arrangement structure is disclosed using a pair of canisters to ensure a required absorption-chamber capacity with the pair of canisters being connected in series.

However, as for a canister installed in a saddle-ride type vehicle with a tight space because of a narrower side-to-side width of the vehicle body as compared with cars, even if a required absorption-chamber capacity can be ensured by a pair of canisters, it is not easy to find a space for installing the canisters and a space for piping connected to the canisters.

SUMMARY AND OBJECTS OF THE INVENTION

The present invention has been made in light of the above-mentioned technical problem. An object of an embodiment of the present invention is to provide a saddle-ride type vehicle that enables the placement of canisters with a required absorption-chamber capacity to be arranged in a compact manner.

To attain the above object, according to an embodiment of the present invention, a saddle-ride type vehicle including:

a head pipe supporting a steering shaft connecting with a handlebar;

a vehicle-body frame connecting with the head pipe; and a fuel tank placed to the rear of the head pipe and supported on an upper portion of the vehicle-body frame, wherein the saddle-ride type vehicle further has a pair of canisters for absorbing evaporated fuel introduced from the fuel tank, the pair of canisters being vertically placed under one side portion of the fuel tank in a position along the vehicle-longitudinal direction.

According to an embodiment of the present invention, coupling pipes, connecting the pair of the canisters to each other in series, are arranged on the front of the pair of the canisters; and an evaporated fuel introducing pipe connecting one canister of the two canisters to the fuel tank with a purge pipe connecting the one canister to an engine intake system, and an outside-air introducing pipe introducing outside air into the other canister being arranged to the rear of the pair of the canisters.

According to an embodiment of the present invention, the pair of the canisters include, respectively, evaporated fuel introducing ports for introducing evaporated fuel, drain ports for draining unwanted substances from the corresponding canisters, outside-air introducing ports for supplying outside air to fuel absorbed, and gas outlets for delivering, as a purge gas, the fuel absorbed in the canisters by outside air. The evaporated fuel introducing ports and the gas outlets are provided on one of the ends of the respective canisters with the drain ports and the outside-air introducing ports being provided on the other ends of the respective canisters. One of the two canisters is arranged to have the one end oriented toward the rear of a vehicle body, and the other end oriented toward the front of the vehicle body. The other canister is arranged to have the one end oriented toward the front of the vehicle body, and the other end oriented toward the rear of the vehicle body. The absorption-system coupling pipe connected between the drain port of the one canister and the evaporated fuel introducing port of the other canister, and the purge-system coupling pipe connected between the outside-air introducing port of the one canister and the gas outlet of the other canister are arranged on the front of the pair of the canisters with the evaporated fuel introducing pipe connecting the evaporated fuel introducing port of the one canister to the fuel tank, the purge pipe connecting the gas outlet of the one canister to the engine intake system, and the outside-air introducing pipe connecting the outside-air introducing port of the other canister to an outside-air introducing path of the vehicle body being arranged on the rear of the pair of the canisters.

According to an embodiment of the present invention, the canister of the paired canisters which is arranged as an upper canister has a larger absorption-chamber capacity than that of the canister which is arranged as a lower canister. In addition, the evaporated fuel introducing pipe and the purge pipe are connected to the upper canister.

According to an embodiment of the present invention, the outside-air introducing pipe has one end connected to the vehicle-body frame to introduce outside air through inside of pipes forming part of the vehicle-body frame. A connection position of the outside-air introducing pipe to the vehicle-body frame is situated at a higher level than an exit of an exhaust pipe from which engine exhaust is emitted.

According to an embodiment of the present invention, a rollover valve is installed in the evaporated fuel introducing pipe to prevent the entry of fuel-droplet component.

According to an embodiment of the present invention, the evaporated fuel introducing pipe is guided from the fuel tank once toward the other side opposite to an one side of the fuel tank where the pair of the canisters is arranged and also in the upward direction, then turns back in a U-shape to be connected to the canister located on the one side. The rollover valve is situated between the exit of the fuel tank and a U-shaped portion.

According to an embodiment of the present invention, a pair of left and right front wheels independently suspended with a pair of left and right front shock absorbers being mounted between the front wheels and the vehicle-body frame, wherein the pair of the canisters are arranged in vicinity of the rear of any one of the left and right front shock absorbers.

According to an embodiment of the present invention, the fuel tank has a tank bulging portion placed on the one side portion to jut outwardly in a vehicle-width direction with the pair of the canisters being situated under the tank bulging portion and arranged more inward than an outer end of the tank bulging portion.

According to an embodiment of the present invention, the pair of the canisters is vertically placed under the one side portion of the fuel tank in a position along the vehicle-longitudinal direction. This enables the displacement of canisters having a required absorption-chamber capacity in a compact manner even in a saddle-ride type vehicle with a tight space because of a narrower side-to-side width of the vehicle body. Further, a reduction in length of the evaporated fuel introducing pipe from the fuel tank and the coupling pipes between the canisters is made possible.

According to an embodiment of the present invention, arranging the coupling pipes between the canisters on the front side and the connection pipes to other devices on the rear side makes it possible to achieve a shortening of piping and to facilitate the piping connection to the canisters.

According to an embodiment of the present invention, the pair of canisters which is vertically arranged is placed to be oriented opposite to each other in the front-rear direction. This makes possible the collective arrangement of the coupling pipes between the canisters on the front side and the connection pipes to the other devices on the rear side.

According to an embodiment of the present invention, the upper canister to which the evaporated fuel introducing pipe and the purge pipe are connected has a larger absorption-chamber capacitor than that of the lower canister. This makes it possible to minimize the return amount of purge gas from the lower canister toward the upper canister during delivering of the purge gas (at purging). As a result, the pair of canisters is connected to each other in series, yet makes possible to hold a steady concentration of purge gas delivered into the engine intake system for a smaller change in the air-fuel ratio to thus have less effect on the engine performance.

According to an embodiment of the present invention, the vehicle-body frame is utilized to introduce outside air and the connection position to the vehicle-body frame is located at a higher level than the exit of the exhaust pipe. This makes it possible to shorten the outside-air introducing pipe and to also prevent the entry of water into the outside-air introducing pipe.

According to an embodiment of the present invention, because the rollover valve is installed in the evaporated fuel introducing pipe, the entry of fuel droplet component into the canisters can be prevented.

According to an embodiment of the present invention, the evaporated fuel introducing pipe is guided from the fuel tank once toward the other side opposite to one side of the fuel tank where the pair of the canisters is arranged and also in the upward direction, then turns back in a U-shape to be connected to the canister located on the one side. The rollover valve is situated between the exit of the fuel tank and the U-shaped portion. Therefore, even if the vehicle is largely tilted in a left-right direction, the fuel droplet component entering the pipe can be prevented from remaining within the pipe, leading to the prevention of an increase of gas absorbed in the canisters due to the evaporation of the remaining fuel-droplet component.

According to an embodiment of the present invention, because the pair of the canisters is placed in the vicinity of the rear of any one of the left and right front shock absorbers, it is possible to maximize the room to the rear of the front shock absorber for the placement of the pair of the canisters and also to protect the pair of the canisters through the use of the front shock absorber.

According to an embodiment of the present invention, because the pair of the canisters is situated under the tank bulging portion and placed more inwardly than the outer end of the tank bulging portion, the pair of the canisters can be prevented from jutting out in the vehicle-width direction. In addition, the pair of canisters are also protected by the tank bulging portion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
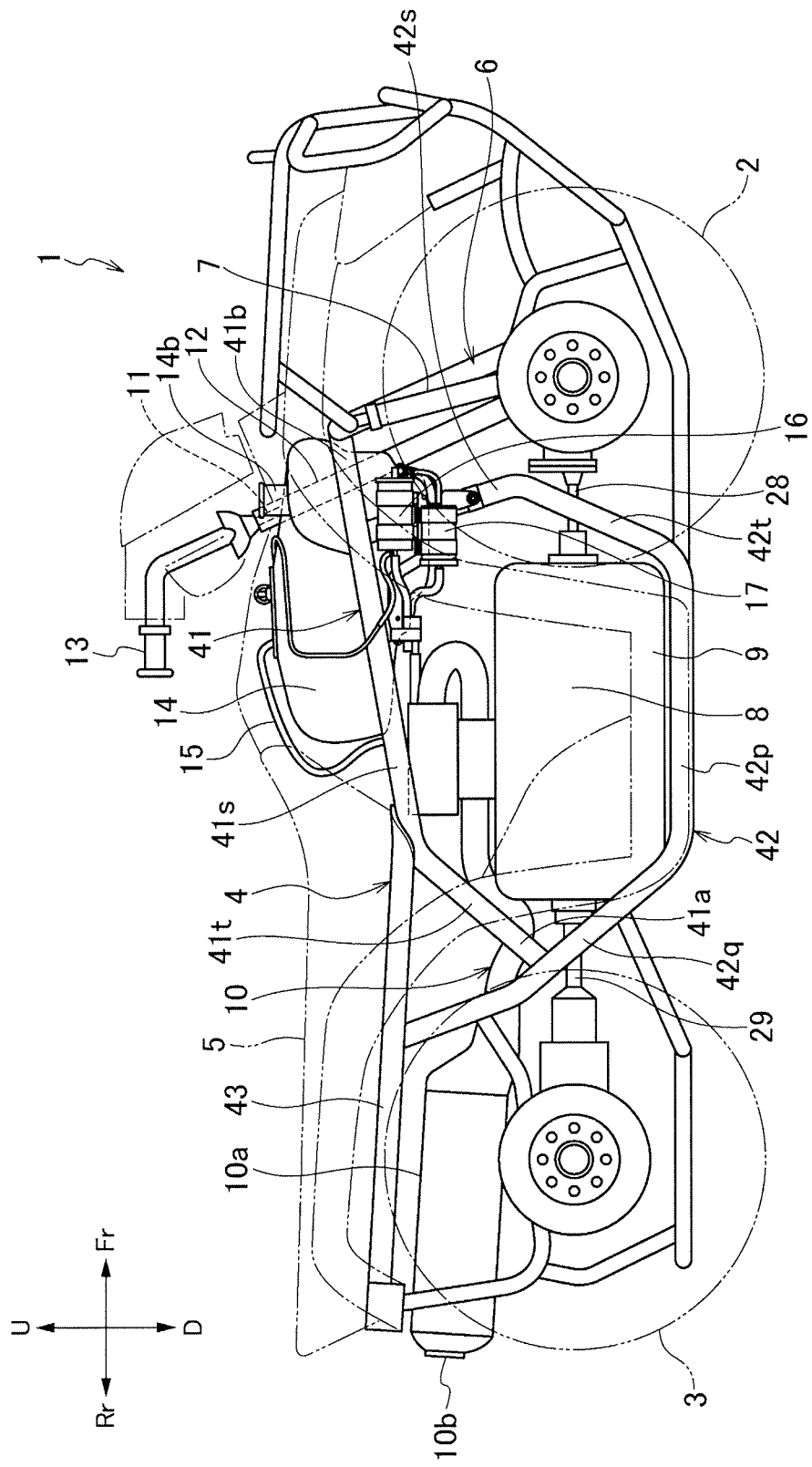
FIG. 1 is a side view of an essential part of a saddle-ride type vehicle in accordance with a first embodiment of the present invention.

Embodiments of a saddle-ride type vehicle in accordance with the present invention will now be described with reference to the accompanying drawings. It should be noted that the drawings will viewed in a direction of reference signs, and words "front," "rear," "left," "right," "up" and "down" are used in the following description with respect to the directions as viewed by an operator, while in the drawings, the forward direction of the vehicle is designated by reference sign Fr, the rearward direction Rr, the left direction L, the right direction R, the upward direction U, and the downward direction of the vehicle is designated by reference sign D.

FIG. 1 is a side view of a saddle-ride type vehicle according to an embodiment of the present invention.

The saddle-ride type vehicle 1 illustrated in FIG. 1 is an All-Terrain Vehicle, ATV, having a higher minimum ground clearance for enhanced off-road performance mainly on rough terrain, which includes a pair of left and right front wheels 2 and a pair of left and right rear wheels 3 with low-pressure balloon tires having a relatively large diameter, the wheels 2 and 3 being mounted at the front and the rear of the vehicle body are reduced in size and weight.

The saddle-ride type vehicle 1 has a metal-made vehicle-body frame 4 formed of metal materials including a plurality of metallic pipes integrally combined together by welding or the like. The vehicle-body frame 4 is formed into a frame extending in the front-rear direction for supporting the front wheels 2, the rear wheels 3 and the like. In FIG. 1 an occupant seat 5 is provided on which an occupant is to sit between the front wheels 2 and the rear wheels 3.

Figure 2:
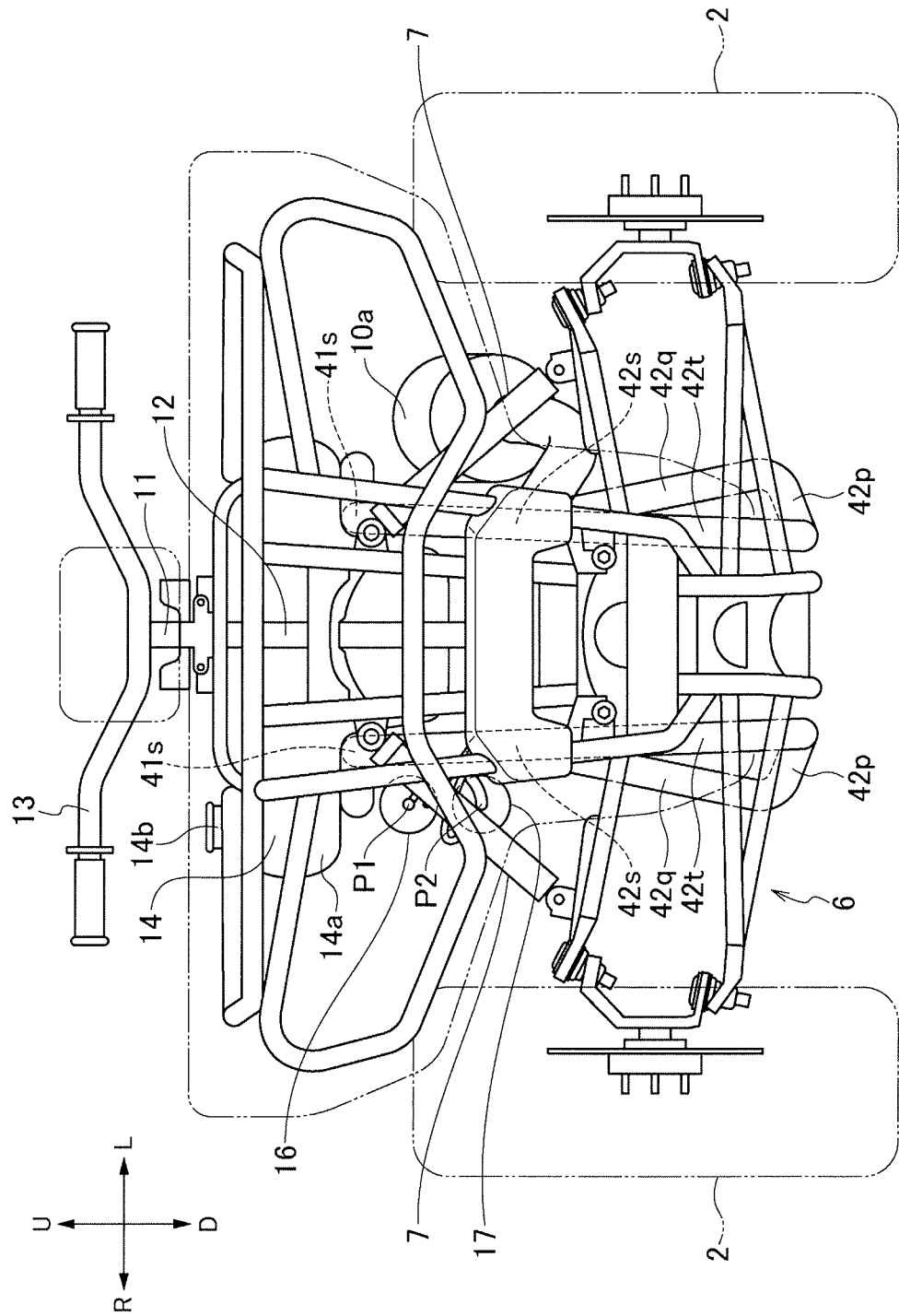
FIG. 2 is a front view of an essential part of the saddle-ride type vehicle in FIG. 1.

FIG. 2 is a front view of an essential part of the saddle-ride type vehicle.

As illustrated in FIG. 2, a pair of left and right independent front suspensions 6 is mounted on the left and right sides of a front portion of the vehicle-body frame 4. The left and right front wheels 2 are suspended through the left and right front suspensions 6. The front suspensions 6 are of a double wishbone type with pairs of upper and lower arms suspending the front wheels 2. The front suspensions 6 have a pair of left and right front shock absorbers 7 extending between the vehicle-body frame 4 and the front wheels 2 in an up-down direction.

A pair of left and right independent rear suspensions is mounted on the left and right sides of a rear portion of the vehicle-body frame 4. The left and right rear wheels 3 are suspended through the left and right rear suspensions. The rear suspensions and a pair of left and right rear shock absorbers mounted between the vehicle-body frame 4 and the rear wheels 3 are omitted from the drawings.

The vehicle-body frame 4 is formed of a plurality of kinds of steel materials combined together by welding or the like, in which pairs of left and right frame elements, mainly including left and right upper pipes 41, lower pipes 42 and rear pipes 43, are combined through a plurality of cross members to form a box structure which is long along the front-rear direction in a central portion in the vehicle-width direction. The upper pipe 41 includes an upper inclined portion 41s extending in the vehicle-longitudinal direction and in a slightly-obliquely rearward and downward direction, and a rear inclined portion 41t extending at a larger inclination angle from the rear end of the upper inclined portion 41s in an obliquely rearward and downward direction. The lower pipe 42 includes a front upper inclined portion 42s connected to a front portion of the upper inclined portion 41s of the upper pipe 41 to extend in an obliquely forward and downward direction, a front lower inclined portion 42t extending from the lower end of the front upper inclined portion 42s in an obliquely rearward and downward direction to form an obtuse angle with respect to the front upper inclined portion 42s, a lower horizontal portion 42p extending approximately horizontally rearwardly from the lower end of the front lower inclined portion 42t in the front-rear direction, and a rear inclined portion 42q extending from the rear end of the lower horizontal portion 42p in an obliquely rearward and upward direction. The rear end of the rear inclined portion 41t of the upper pipe 41 is connected to an approximately middle portion of the rear inclined portion 42q in the up-down direction. The lower horizontal portions 42p of the respective lower pipes 42 extend from the connections to the front lower inclined portions 42t toward the connections to the rear inclined portions 42q as being more distant from each other in the vehicle-width direction.

The rear pipe 43 extends approximately horizontally rearward from the connection between the upper inclined portion 41s and the rear inclined portion 41t of the upper pipe 41 in the front-rear direction, and the rear inclined portion 42q of the lower pipe 42 is connected to an approximately middle portion of the rear pipe 43 in the front-rear direction.

As illustrated in FIG. 1, an engine 8, which is an internal combustion engine, is placed in a longitudinally central portion of the vehicle-body frame 4. The engine 8 is a water-cooled single cylinder engine. A crankcase 9 forming a lower part of the engine 8 serves also as a transmission case housing a transmission. Propeller shafts 28, 29 respectively connected to the transmission within the crankcase 9 for the front wheels and the rear wheels extend respectively in a forward and a rearward direction from the front and rear of the crankcase 9 for the transfer of the rotational power to the front wheels 2 and the rear wheels 3.

An exhaust pipe 10 is connected to the front of the engine 8. The exhaust pipe 10 extends rearwardly on the left side of the vehicle body to be connected to an exhaust muffler 10a which is placed at the rear of the vehicle-body frame 4. Then, the engine exhaust is discharged from an exit 10b extending further rearwardly from the exhaust muffler 10a. Because water entering through the exit 10b of the exhaust pipe 10 causes an exhaust failure leading to an engine 8 malfunction, the exit 10b of the exhaust pipe 10 is located at a height which prevents water from easily entering. By placing the exit 10b of the exhaust pipe 10 at a level below a predetermined water level causing severe trouble, the water is prevented from reaching the predetermined water level.

The vehicle-body frame 4 includes a head pipe 12 provided in a side-to-side central portion of the front portion of the vehicle-body frame 4 to support a steering shaft 11. A handlebar 13 is attached integrally with an upper portion of the steering shaft 11. The front wheels 2 are steered in the left and right directions in response to the operation of the handlebar 13.

Figure 3:
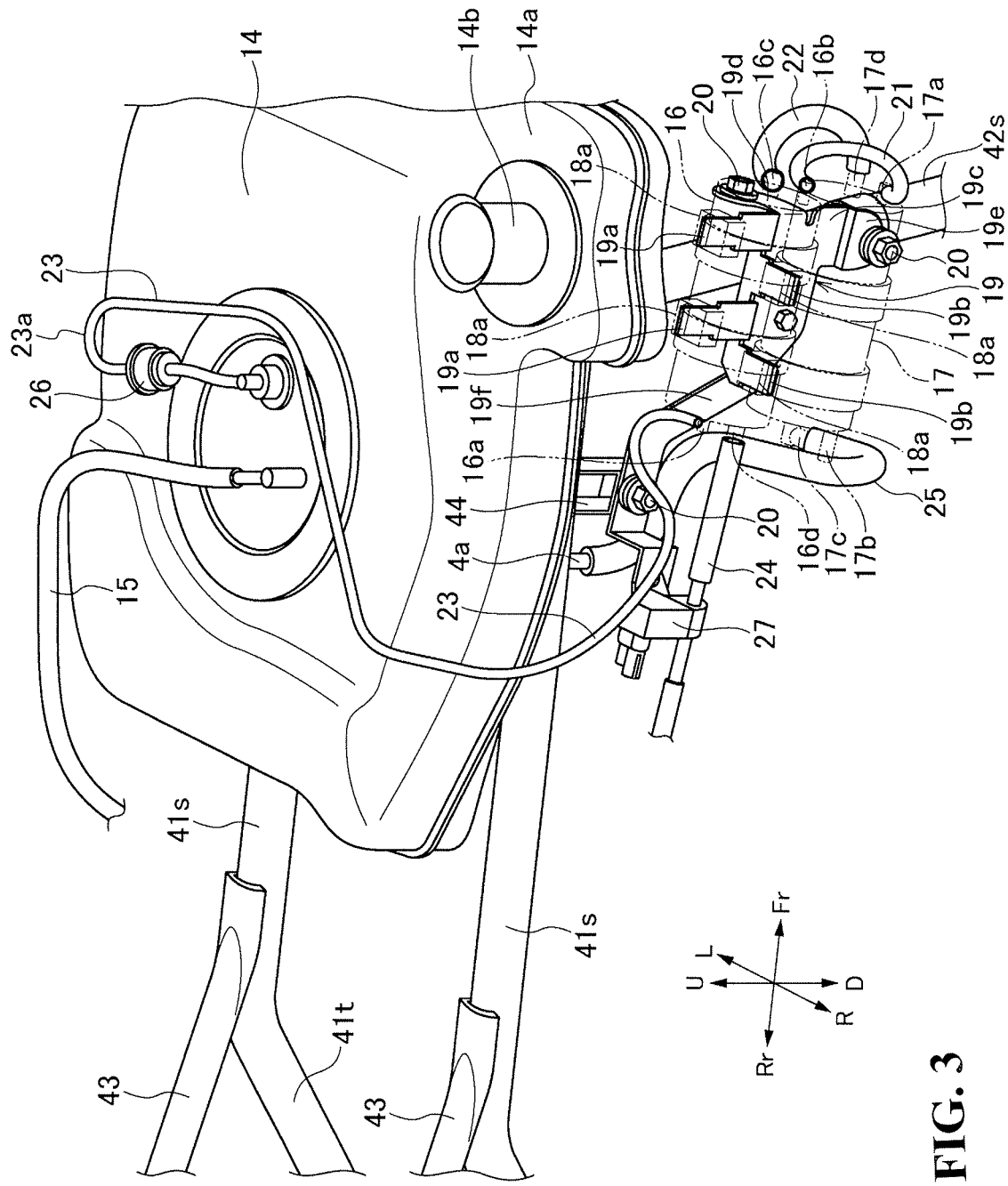
FIG. 3 is a perspective view of an essential part around canisters, illustrating piping for the canisters.

A fuel tank 14 is placed at the rear of the head pipe 12 to be supported by the upper portion of the vehicle-body frame 4. The fuel tank 14 is provided with a fuel pump (not shown) for supplying the fuel in the tank to the engine 8. The fuel delivered by the fuel pump is fed into the engine 8 through a fuel supply pipe 15 which is connected to an upper portion of the fuel tank 14. As illustrated in FIG. 2 and FIG. 3, the fuel tank 14 has a front right end jutting out toward the outside (rightward) in the width direction to form a tank bulging portion 14a above the upper inclined portion 41s of the upper pipe 41. A refueling port 14b is provided in the tank bulging portion 14a.

Figure 4:
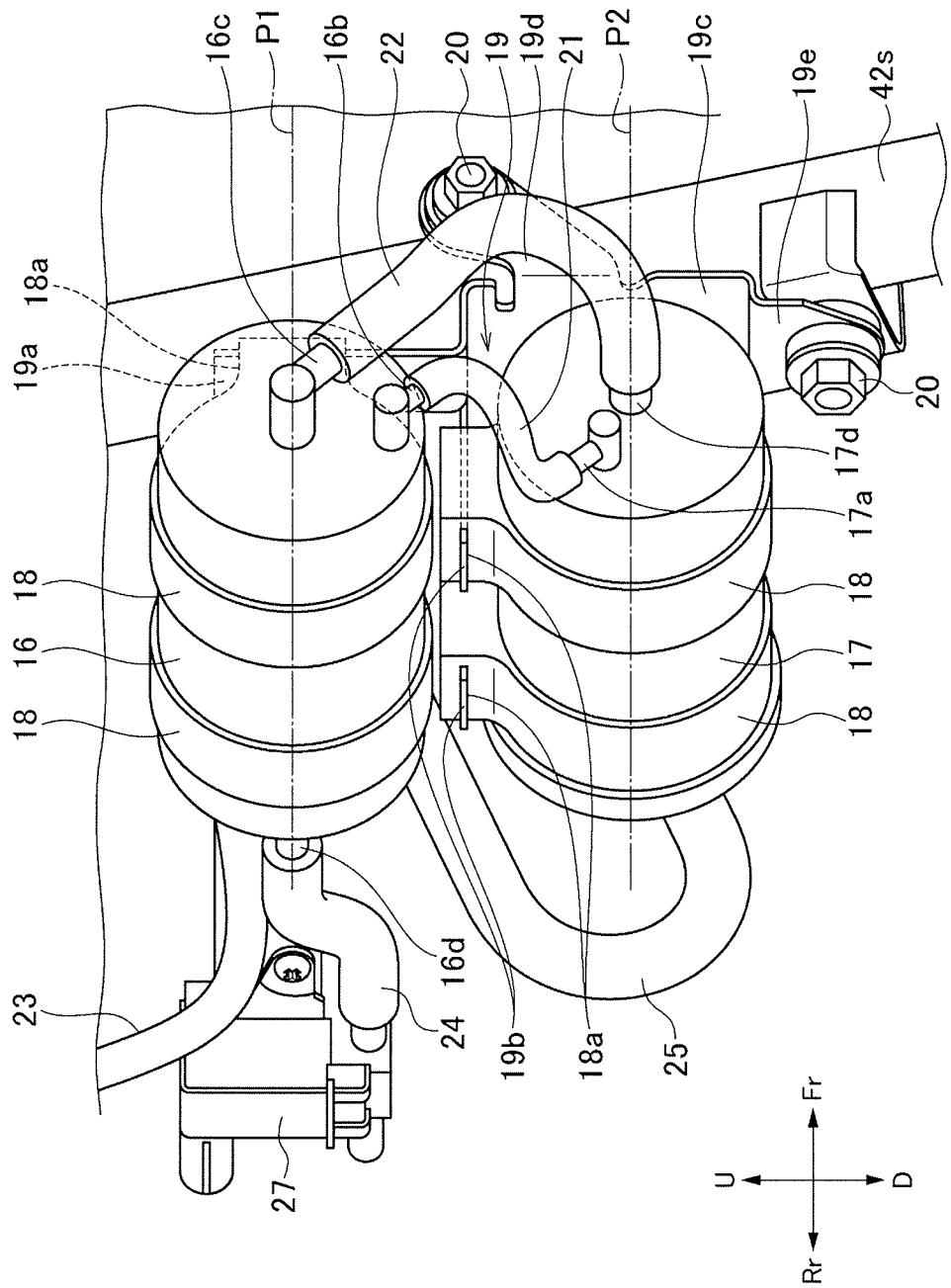
FIG. 4 is a perspective view of the pair of canisters when viewed from front left corner.

FIG. 3 is a perspective view of an essential part around the fuel tank 14, illustrating piping for canisters 16, 17. FIG. 4 is a perspective view of the pair of canisters 16, 17 when viewed from front left corner. In FIG. 3, the canisters 16, 17 are shown by a two-dot chain pipe.

As illustrated in FIG. 1 to FIG. 4, the saddle-ride type vehicle 1 is equipped with the canisters 16, 17 for absorption of evaporated fuel generated within the fuel tank 14. For the canisters 16, 17, for example, a charcoal canister is used which has an absorption chamber holding activated carbon to cause the activated carbon to absorb evaporated fuel.

The evaporated fuel displaced from the fuel tank 14 is promptly absorbed in the canisters 16, 17, raising a need to ensure an absorption-chamber capacity in accordance with the capacity of the fuel tank 14. In the saddle-ride type vehicle 1 according to an embodiment of the present invention, while the absorption-camber capacity is ensured in accordance with the capacity of the fuel tank 14, the pair of canisters 16, 17 is installed for a higher degree of freedom in placement of the canisters 16, 17. The same type of two canisters are used as the pair of canisters 16, 17 in the embodiment, but a combination of canisters with different absorption-chamber capacities may be used as described in other embodiments which will be mentioned later.

The pair of the canisters 16, 17 is vertically placed under a right side portion of the fuel tank 14 in a position along the vehicle-longitudinal direction. More specifically, the canisters 16, 17 according to the embodiment have a circular cylinder shape and are vertically arranged below the front of the right portion of the fuel tank 14 while having their axes P1, P2 extending in the vehicle-longitudinal direction. Also, the canisters 16, 17 are supported by the vehicle-body frame 4 via a plurality of holders 18 and a support plate 19.

The support plate 19 has a pair of front and rear upper projection pieces 19a protruding upwardly from a sheet-shaped plate body 19c, and a pair of front and rear side projection pieces 19b protruding toward the outside in the lateral direction. The support plate 19 is fastened to the vehicle-body frame 4 through a plurality of bolts 20 (three bolts 20 in the embodiment). More specifically, a front supporter 19d is provided to extend inward from a front end of the plate body 19c in the vehicle-width direction. A lower supporter 19e is provided to extend downwardly from the front end of the plate body 19c in the up-down direction. The front supporter 19d and the lower supporter 19e are secured to the front upper inclined portion 42s of the lower pipe 42 with the bolts 20, respectively. A rear supporter 19f extending from a rear end of the plate body 19c in an obliquely rearward and upward direction is secured to a bracket 44 attached to the upper inclined portion 41s of the upper pipe 41 with the bolt 20. The holder 18 is a ring-shaped holding member holding a barrel portion of the canister 16, 17, which is fixed to the support plate 19 by inserting the upper projection piece 19a or side projection piece 19b into a mounting hole 18a formed in one end of the holder 18.

In the embodiment, for placing the pair of the canisters 16, 17 under the right portion of the fuel tank 14, the pair of the canisters 16, 17 are placed near the rear of the right front shock absorber 7. By placing the pair of the canisters 16, 17 in an empty space existing to the rear of the right front shock absorber 7, the front shock absorber 7 is utilized to protect the pair of the canisters 16, 17. Also, for placing the pair of the canisters 16, 17 under the right portion of the fuel tank 14, the pair of the canisters 16, 17 are placed under the tank bulging portion 14a of the fuel tank 14 to be located inwardly of the outer end of the tank bulging portion 14a as illustrated in FIG. 2. By placing the pair of the canisters 16, 17 in an empty space under the tank bulging portion 14a of the fuel tank 14 such that the canisters 16, 17 do not extend outward beyond the outer end of the tank bulging portion 14a, the tank bulging portion 14a is utilized to protect the pair of the canisters 16, 17.

Further, in the embodiment, in order to shorten the piping and improve the ease of piping connection, coupling pipes 21, 22 are arranged on the front sides of the pair of the canisters 16, 17 for connection between the canisters 16, 17 in series. In addition, on the rear sides of the pair of the canisters 16, 17, an evaporated fuel introducing pipe 23 connecting one canister 16 of the canisters to the fuel tank 14, a purge pipe 24 connecting one canister 16 of the canisters to the engine intake system and an outside-air introducing pipe 25 connecting the other canister 17 to an outside-air introducing path of the vehicle body are arranged.

The following description is given of the configuration and arrangement of the canisters 16, 17 enabling such piping arrangement.

Each of the canisters 16, 17 includes an evaporated fuel introducing port 16a, 17a for introducing evaporated fuel, a drain port 16b, 17b for draining unwanted substances from the canister 16, 17, an outside-air introducing port 16c, 17c for introducing outside air for the absorbed fuel, and a gas outlet 16d, 17d for delivering the fuel absorbed in the canister 16, 17 as a purge gas. The evaporated fuel introducing ports 16a, 17a and the gas outlets 16d, 17d are provided on one end of the respective canisters 16, 17, while the drain ports 16b, 17b and the outside-air introducing ports 16c, 17c are provided on the other end of the respective canisters 16, 17.

One canister 16 of the canisters is arranged to have one end facing toward the rear of the vehicle body and the other end facing toward the front of the vehicle body, while the other canister 17 is arranged to have one end facing toward the front of the vehicle body and the other end facing toward the rear of the vehicle body. In short, the pair of the canisters 16, 17 are vertically arranged in positions in which the canisters 16, 17 are oriented opposite to each other in the front-rear direction.

More specifically, the upper canister 16 is arranged such that one end on which the evaporated fuel introducing port 16a and the gas outlet 16d are formed faces toward the rear of the vehicle and the other end on which the drain port 16b and the outside-air introducing port 16c are formed faces toward the front of the vehicle. The lower canister 17 is arranged such that one end on which the evaporated fuel introducing port 17a and the gas outlet 17d are formed faces toward the front of the vehicle and the other end on which the drain port 17b and the outside-air introducing port 17c are formed faces toward the rear of the vehicle.

In front of the pair of the canisters 16, 17, the absorption-system coupling pipe 21 connected between the drain port 16b of the upper canister 16 and the evaporated fuel introducing port 17a of the lower canister 17, and the purge-system coupling pipe 22 connected between the outside-air introducing port 16c of the upper canister 16 and the gas outlet 17d of the lower canister 17 are arranged.

At the rear of the pair of the canisters 16, 17, on the other hand, the evaporated fuel introducing pipe 23 connecting the evaporated fuel introducing port 16a of the upper canister 16 to the fuel tank 14, the purge pipe 24 connecting the gas outlet 16d of the upper canister 16 to the engine intake system and the outside-air introducing pipe 25 connecting the outside-air introducing port 17c of the lower canister 17 to the outside-air introducing path of the vehicle body are arranged.

As illustrated in FIG. 3, the evaporated fuel introducing pipe 23 is led from the upper portion of the fuel tank 14 to extend to the upper canister 16. A rollover valve 26 is installed in proximity to a fuel-tank leading-out portion of the evaporated fuel introducing pipe 23 to allow the entry of evaporated fuel while restricting the entry of fuel droplet component.

The evaporated fuel introducing pipe 23 is routed from the exit of the fuel tank 14 once toward the left (in the direction opposite to the canisters) and also in the upward direction, then turns back in a U-shape to form a U-shaped portion 23a, and then is routed rightward (toward the canisters) to be connected to the canister 16. The rollover valve 26 is situated between the exit of the fuel tank 14 and the U-shaped portion 23a. Thus, even if the vehicle is largely tilted in a left-right direction, the fuel droplet component entering the evaporated fuel introducing pipe 23 can be prevented from remaining within the pipe, leading to the prevention of an increase of gas absorbed in the canisters 16, 17 due to the evaporation of the remaining fuel-droplet component.

The outside-air introducing path for introducing outside air into the canisters 16, 17 is formed in the pipes forming the vehicle-body frame 4. The outside-air introducing pipe 25 has one end connected to a joint pipe 4a provided in the vehicle-body frame 4 so that the outside air introduced from the vehicle-body frame 4 is introduced into the canister 17. In this connection, the connection position of the outside-air introducing pipe 25 to the vehicle-body frame 4 (the position of the joint pipe 4a) is located at a level higher than the exit 10b of the exhaust pipe 10. It should be noted that, in the embodiment, the joint pipe 4a is formed on a portion of the upper pipe 41 having a lower end 41a located at a level lower than the exit 10b and an upper end 41b located at a level higher than the exit 10b, the portion being located at a level higher than the exit 10b as illustrated in FIG. 1, but is not limited thereto.

The purge pipe 24 is connected to the engine intake system through a control valve 27 fixed to a rear end of the rear supporter 19f of the support plate 19. Upon opening of the control valve 27 in response to an instruction from a not-shown control unit, with generating a negative pressure within the purge pipe 24, the outside-air introducing pipe 25 communicating with this through the pair of the canisters 16, 17 introduces the outside air from the outside-air introduce path of the vehicle body into the lower canister 17. If absorbed fuel exists in the lower canister 17, the fuel absorbed in the lower canister 17 is delivered as purge gas into the upper canister 16. On the other hand, if there is no absorbed fuel in the lower canister 17, the outside air introduced into the lower canister 17 is delivered into the upper canister 16.

Upon delivery of the purge gas or outside air into the upper canister 16, the fuel absorbed in the upper canister 16 is discharged as purge gas into the purge pipe 24. Then, the purge gas is fed to the engine intake system to be burned in the engine 8.

As described above, with the saddle-ride type vehicle 1 according to the embodiment, because the pair of the canisters 16, 17 are vertically arranged below a one side portion of the fuel tank 14 in a position along the vehicle-longitudinal direction, this enables the displacement of canisters 16, 17 having a required absorption-chamber capacity in a compact manner even in the saddle-ride type vehicle 1 with a tight space because of a narrower side-to-side width of the vehicle body. Further, a reduction in the length of the evaporated fuel introducing pipe 23 from the fuel tank 14 and the coupling pipes 21, 22 between the canisters 16, 17 is made possible.

Arranging the coupling pipes 21, 22 between the canisters 16, 17 on the front side and the connection pipes 23 to 25 to other devices on the rear side makes it possible to achieve the shortening of piping and facilitate the piping connection to the canisters 16, 17.

The pair of canisters 16, 17 which is vertically arranged is placed to be oriented opposite to each other in the front-rear direction. This makes possible the collective arrangement of the coupling pipes 21, 22 between the canisters 16, 17 on the front side and the connection pipes 23 to 25 to the other devices on the rear side.

The vehicle-body frame 4 is utilized to introduce outside air and the connection position to the vehicle-body frame 4 is located at a higher level than the exit 10b of the exhaust pipe 10. This makes it possible to shorten the outside-air introducing pipe 25 and also prevent the entry of water into the outside-air introducing pipe 25.

Because the rollover valve 26 is installed in the evaporated fuel introducing pipe 23, the entry of fuel droplet component into the canisters 16, 17 can be prevented.

The evaporated fuel introducing pipe 23 is guided from the fuel tank 14 once toward the other side opposite to an one side of the fuel tank 14 where the pair of the canisters 16, 17 is arranged and also in the upward direction, then turns back in a U-shape to be connected to the canister 16 located on the one side. The rollover valve 26 is situated between the exit of the fuel tank 14 and the U-shaped portion 23a. In view of this construction, even if the vehicle is largely tilted in a left-right direction, the fuel droplet component entering the pipe can be prevented from remaining within the pipe, leading to the prevention of an increase in gas absorbed in the canisters 16, 17 due to the evaporation of the remaining fuel-droplet component.

Because the pair of the canisters 16, 17 is placed in the vicinity of the rear of the front shock absorber 7, it is possible to maximize the room to the rear of the front shock absorber 7 for the placement of the pair of the canisters 16, 17 and also to protect the pair of the canisters 16, 17 through the use of the front shock absorber 7.

Because the pair of the canisters 16, 17 is situated under the tank bulging portion 14a of the fuel tank 14 and placed more inwardly than the outer end of the tank bulging portion 14a, the pair of the canisters 16, 17 can be prevented from jutting out in the vehicle-width direction and also be protected by the tank bulging portion 14a.

Figure 5:
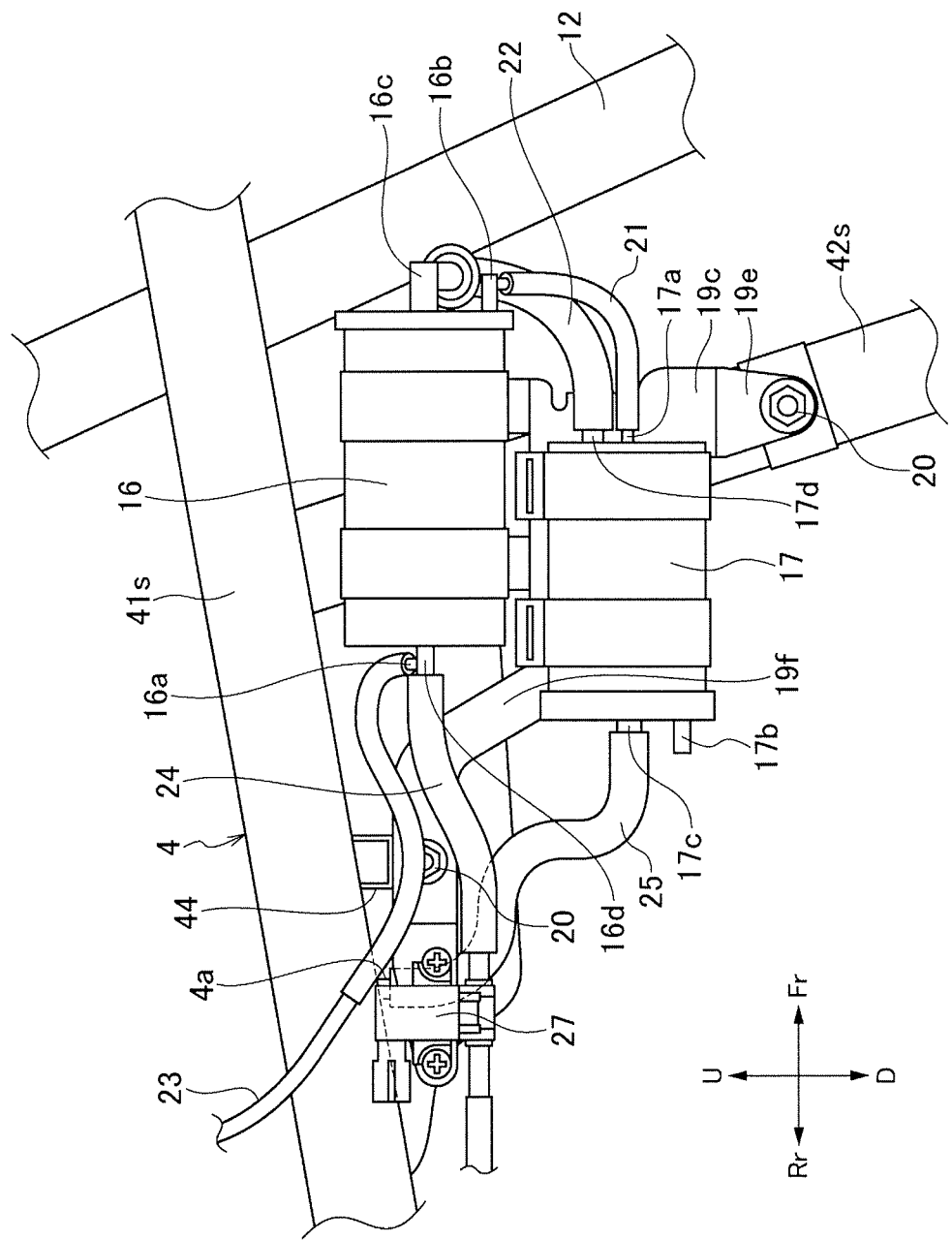
FIG. 5 is a side view illustrating the pair of canisters in accordance with a second embodiment.
Figure 6:
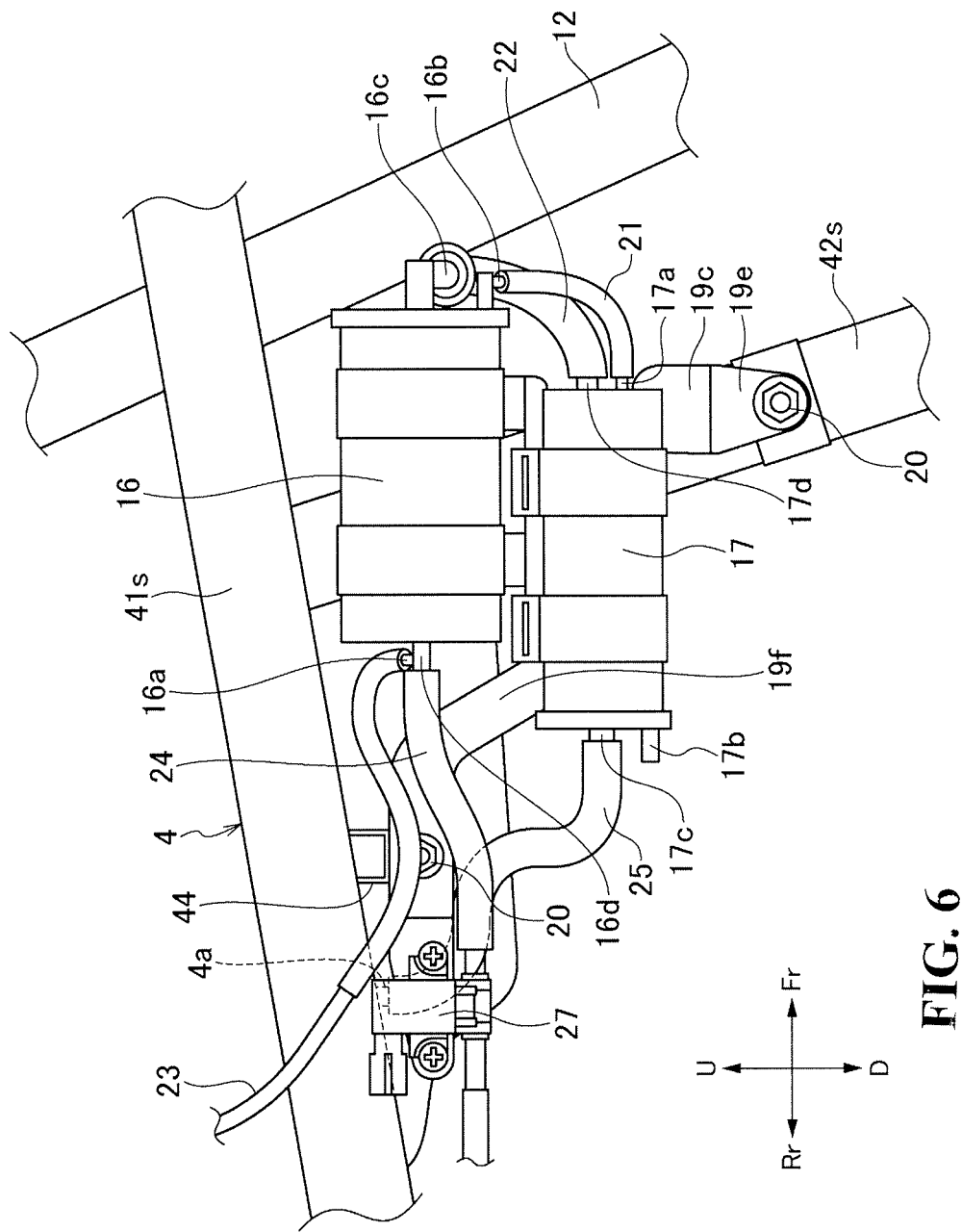
FIG. 6 is a side view illustrating the pair of canisters in accordance with a third embodiment.

A second embodiment and a third embodiment in accordance with the present invention will be described with reference to FIG. 5 and FIG. 6. It should be noted that a common configuration with the foregoing embodiment are indicated with the same reference signs as those in the foregoing embodiment, whereby the description in the foregoing embodiment is incorporated.

The second embodiment and the third embodiment differ from the foregoing embodiment in that, in the pair of canisters 16, 17, the upper canister 16 connected to the evaporated fuel introducing pipe 23 and the purge pipe 24 has a larger absorption-chamber capacity than that of the lower canister 17. For example, in the second embodiment illustrated in FIG. 5, the upper canister 16 with the same diameter and a longer length and the lower canister 17 with the same diameter and a shorter length are provided. For example, in the third embodiment illustrated in FIG. 6, the upper canister 16 with the same length and a larger diameter dimension and the lower canister 17 with the same length and a smaller diameter dimension are provided.

According to such embodiments, the absorption-chamber capacity corresponding to the capacity of the fuel tank 14 is able to be ensured for prompt absorption of evaporated fuel displaced from the fuel tank 14.

It should be understood that the present invention is not limited to the above-described embodiments and modifications, and alterations and the like may be made as appropriate.

For example, the above-described embodiments have described the canisters 16, 17 which are vertically arranged in a position under the front of the right side portion of the fuel tank 14, but the canisters 16, 17 may be vertically arranged in a position under a front portion, a center or a rear portion of the left side portion of the fuel tank 14.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle-ride vehicle, comprising:
 a head pipe supporting a steering shaft connecting with a handlebar;
 a vehicle-body frame connecting with the head pipe;

a fuel tank placed to a rear of the head pipe and supported on an upper portion of the vehicle body frame; and
a pair of canisters for absorbing evaporated fuel introduced from the fuel tank, the pair of the canisters being vertically placed under one side portion of the fuel tank in a position along a vehicle-longitudinal direction,
wherein at least part of a first canister of the pair of canisters overlaps a second canister of the pair of canisters in the vehicle-longitudinal direction and partially sits above the second canister in a vertical plane.

2. The saddle-ride type vehicle according to claim 1, further comprising:
a pair of left and right front wheels independently suspended; and
a pair of left and right front shock absorbers mounted between the front wheels and the vehicle-body frame;
wherein the pair of the canisters are arranged in vicinity of the rear of any one of the left and right front shock absorbers.

3. The saddle-ride vehicle according to claim 1, wherein:
the fuel tank has a tank bulging portion placed on the one side portion to jut outwardly in a vehicle-width direction; and
the pair of the canisters are situated under the tank bulging portion and arranged more inwardly than an outer end of the tank bulging portion.

4. The saddle-ride type vehicle according to claim 1, wherein the fuel tank has a perimeter, and
wherein the pair of the canisters are under the fuel tank and within an area bounded by the perimeter of the fuel tank.

5. The saddle-ride type vehicle according to claim 1, wherein the vehicle-body frame comprises an upper pipe and a rear pipe extending rearwardly from the upper pipe, wherein the fuel tank rests on the upper pipe, and
further comprising a bracket attached to the upper pipe, the bracket retaining the pair of canisters.

6. The saddle-ride type vehicle according to claim 1, wherein the pair of canisters are supported by a holder.

7. A saddle-ride vehicle, comprising:
a head pipe supporting a steering shaft connecting with a handlebar;
a vehicle-body frame connecting with the head pipe;
a fuel tank placed to a rear of the head pipe and supported on an upper portion of the vehicle body frame;
a pair of canisters for absorbing evaporated fuel introduced from the fuel tank, the pair of the canisters being vertically placed under one side portion of the fuel tank in a position along the vehicle-longitudinal direction;
coupling pipes connecting the pair of the canisters to each other in series arranged on the front of the pair of the canisters; and
an evaporated fuel introducing pipe connecting one canister of the pair of the canisters to the fuel tank, a purge pipe connecting the one canister to an engine intake system, and an outside-air introducing pipe introducing outside air into the other canister arranged on a rear of the pair of the canisters.

8. The saddle-ride vehicle according to claim 7, wherein:
the pair of the canisters include, respectively;
evaporated fuel introducing ports for introducing evaporated fuel;
drain ports for draining unwanted substances from the corresponding canisters;
outside-air introducing ports for supplying outside air to absorbed fuel; and
gas outlets for delivering, as a purge gas, the fuel absorbed in the canisters by outside air;
the evaporated fuel introducing ports and the gas outlets are provided on one of an end of the respective canisters;
the drain ports and the outside-air introducing ports are provided on the other end of the respective canisters;
one canister of the pair of the canisters is arranged to have a first end oriented toward the rear of a vehicle body, and a second end oriented toward the front of the vehicle body;
the other canister is arranged to have a first end oriented toward the front of the vehicle body, and a second end oriented toward the rear of the vehicle body;
the absorption-system coupling pipe connected between the drain port of the one canister and the evaporated fuel introducing port of the other canister, and the purge-system coupling pipe connected between the outside-air introducing port of the one canister and the gas outlet of the other canister are arranged on the front of the pair of the canisters; and
the evaporated fuel introducing pipe connecting the evaporated fuel introducing port of the one canister to the fuel tank, the purge pipe connecting the gas outlet of the one canister to the engine intake system, and the outside-air introducing pipe connecting the outside-air introducing port of the other canister to an outside-air introducing path of the vehicle body are arranged to the rear of the pair of the canisters.

9. The saddle-ride vehicle according to claim 8, wherein the canister of the pair of the canisters which is arranged as an upper canister has a larger absorption-chamber capacity than that of the canister which is arranged as a lower canister, and the evaporated fuel introducing pipe and the purge pipe are connected to the upper canister.

10. The saddle-ride vehicle according to claim 8, wherein:
the outside-air introducing pipe has one end connected to the vehicle-body frame to introduce outside air through inside of pipes forming part of the vehicle-body frame; and
a connection position of the outside-air introducing pipe to the vehicle-body frame is situated at a higher level than an exit of an exhaust pipe from which engine exhaust is emitted.

11. The saddle-ride vehicle according to claim 7, wherein the canister of the pair of the canisters which is arranged as an upper canister has a larger absorption-chamber capacity than that of the canister which is arranged as a lower canister, and the evaporated fuel introducing pipe and the purge pipe are connected to the upper canister.

12. The saddle-ride vehicle according to claim 11, wherein:
the outside-air introducing pipe has one end connected to the vehicle-body frame to introduce outside air through inside of pipes forming part of the vehicle-body frame; and
a connection position of the outside-air introducing pipe to the vehicle-body frame is situated at a higher level than an exit of an exhaust pipe from which engine exhaust is emitted.

13. The saddle-ride vehicle according to claim 7, wherein:
the outside-air introducing pipe has one end connected to the vehicle-body frame to introduce outside air through inside of pipes forming part of the vehicle-body frame; and a connection position of the outside-air introducing pipe to the vehicle-body frame is situated at a higher level than an exit of an exhaust pipe from which engine exhaust is emitted.

14. The saddle-ride vehicle according to claim 7, wherein a rollover valve is installed in the evaporated fuel introducing pipe to prevent entry of fuel-droplet component.

15. The saddle-ride vehicle according to claim 14, wherein:
the evaporated fuel introducing pipe is guided from the fuel tank once toward the other side opposite to an one side of the fuel tank where the pair of the canisters is arranged and also in the upward direction, then turns back in a U-shape to be connected to the canister of the one side; and
the rollover valve is situated between the exit of the fuel tank and a U-shaped portion.

16. The saddle-ride type vehicle according to claim 7, further comprising:
a pair of left and right front wheels independently suspended; and
a pair of left and right front shock absorbers mounted between the front wheels and the vehicle-body frame;
wherein the pair of the canisters are arranged in vicinity of the rear of any one of the left and right front shock absorbers.

17. The saddle-ride vehicle according to claim 7, wherein:
the fuel tank has a tank bulging portion placed on the one side portion to jut outwardly in a vehicle-width direction; and
the pair of the canisters are situated under the tank bulging portion and arranged more inwardly than an outer end of the tank bulging portion.

18. A saddle-ride vehicle, comprising:
a head pipe supporting a steering shaft;
a vehicle-body frame connecting with the head pipe;
a fuel tank placed to a rear of the head pipe and supported on an upper portion of the vehicle-body frame;
a pair of canisters for absorbing evaporated fuel introduced from the fuel tank, the pair of the canisters being vertically placed under one side portion of the fuel tank in a position along the vehicle-longitudinal direction;
coupling pipes connecting the pair of the canisters to each other in series are arranged on the front of the pair of the canisters;
an evaporated fuel introducing pipe connecting one canister of the pair of the canisters to the fuel tank, a purge pipe connecting the one canister to an engine intake system, and an outside-air introducing pipe introducing outside air into the other canister are arranged on a rear of the pair of the canisters,
wherein the pair of the canisters include, respectively:
evaporated fuel introducing ports for introducing evaporated fuel;
drain ports for draining unwanted substances from the corresponding canisters;
outside-air introducing ports for supplying outside air to absorbed fuel; and
gas outlets for delivering, as a purge gas, the fuel absorbed in the canisters by outside air;
the evaporated fuel introducing ports and the gas outlets are provided on one of an end of the respective canisters;
the drain ports and the outside-air introducing ports are provided on the other end of the respective canisters;
one canister of the pair of the canisters is arranged to have a first end oriented toward the rear of a vehicle body, and a second end oriented toward the front of the vehicle body;
the other canister is arranged to have a first end oriented toward the front of the vehicle body, and a second end oriented toward the rear of the vehicle body;
the absorption-system coupling pipe connected between the drain port of the one canister and the evaporated fuel introducing port of the other canister, and the purge-system coupling pipe connected between the outside-air introducing port of the one canister and the gas outlet of the other canister are arranged on the front of the pair of the canisters; and
the evaporated fuel introducing pipe connecting the evaporated fuel introducing port of the one canister to the fuel tank, the purge pipe connecting the gas outlet of the one canister to the engine intake system, and the outside-air introducing pipe connecting the outside-air introducing port of the other canister to an outside-air introducing path of the vehicle body are arranged to the rear of the pair of the canisters.

19. The saddle-ride vehicle according to claim 18, wherein the canister of the pair of the canisters which is arranged as an upper canister has a larger absorption-chamber capacity than that of the canister which is arranged as a lower canister, and the evaporated fuel introducing pipe and the purge pipe are connected to the upper canister.

20. The saddle-ride vehicle according to claim 19, wherein:
the outside-air introducing pipe has one end connected to the vehicle-body frame to introduce outside air through inside of pipes forming part of the vehicle-body frame; and
a connection position of the outside-air introducing pipe to the vehicle-body frame is situated at a higher level than an exit of an exhaust pipe from which engine exhaust is emitted.

* * * * *